United States Patent
Rengakuji

(10) Patent No.: US 8,134,615 B2
(45) Date of Patent: Mar. 13, 2012

(54) IMAGE DEFECT CORRECTION APPARATUS, IMAGE DEFECT CORRECTION METHOD, AND PROGRAM THEREFOR

(75) Inventor: Hideyuki Rengakuji, Tokyo (JP)

(73) Assignee: Canon Kabushiki Kaisha (JP)

( * ) Notice: Subject to any disclaimer, the term of this patent is extended or adjusted under 35 U.S.C. 154(b) by 1194 days.

(21) Appl. No.: 11/868,410

(22) Filed: Oct. 5, 2007

(65) Prior Publication Data

US 2008/0094492 A1    Apr. 24, 2008

(30) Foreign Application Priority Data

Oct. 24, 2006  (JP) .................................. 2006-288925

(51) Int. Cl.
*H04N 9/64* (2006.01)

(52) U.S. Cl. ..................................................... 348/246

(58) Field of Classification Search .................. 348/241, 348/246, 247, 249
See application file for complete search history.

(56) References Cited

U.S. PATENT DOCUMENTS

| | | | | |
|---|---|---|---|---|
| 7,280,142 B2 * | 10/2007 | Toyoda et al. | ................ | 348/246 |
| 7,483,063 B2 * | 1/2009 | Itakura et al. | ................ | 348/246 |
| 7,580,070 B2 * | 8/2009 | Yanof et al. | ................ | 348/246 |

FOREIGN PATENT DOCUMENTS

| | | |
|---|---|---|
| JP | 1-103375 A | 4/1989 |
| JP | 2004-364266 A | 12/2004 |

* cited by examiner

*Primary Examiner* — Tuan Ho
(74) *Attorney, Agent, or Firm* — Rossi, Kimms & McDowell LLP

(57) ABSTRACT

An image defect correction apparatus capable of satisfactorily correcting a white vertical line caused by point defects on the same vertical CCD. A first correction value is determined from a difference between an average value of luminance signals obtained by a vertical CCD including one or more point defects and an average value of luminance signals obtained by the vertical CCDs when light-receiving elements face a predetermined ineffective signal region. It is determined to which of regions divided by Y addresses of point defects on the same vertical CCD each of Y-directional positions of luminance signals outputted from a horizontal CCD is positioned. The first correction value is multiplied by a predetermined coefficient corresponding to the determined region to calculate a second correction value with which the luminance signals from the horizontal CCD are corrected.

13 Claims, 9 Drawing Sheets

FIG. 7

| TABLE NO. | LINE DEFECT ADDRESS | FIRST Y ADDRESS | SECOND Y ADDRESS | FIRST Y ADDRESS COEFFICIENT | SECOND Y ADDRESS COEFFICIENT |
|---|---|---|---|---|---|
| 0 | $x_1$ | $y_{11}$ | $y_{12}$ | $K_{11}$ | $K_{12}$ |
| 1 | $x_2$ | $y_{21}$ | (NONE) | $K_{21}$ | 0 |
| …… | …… | …… | …… | …… | …… |

IMAGE DEFECT CORRECTION APPARATUS, IMAGE DEFECT CORRECTION METHOD, AND PROGRAM THEREFOR

BACKGROUND OF THE INVENTION

1. Field of the Invention

The present invention relates to an image defect correction apparatus and method, and a program therefor. More particularly, the present invention relates to an image defect correction apparatus for correcting image defect components contained in luminance signals output in a predetermined order from two-dimensionally arranged light-receiving elements via a plurality of vertical charge coupled devices and at least one horizontal charge coupled device, an image defect correction method applied to the image defect correction apparatus, and a program for causing a computer to execute the image defect correction method.

2. Description of the Related Art

In recent years, image pickup apparatuses such as home video cameras and digital still cameras have been in wide spread use. Most of them include a solid-state image pickup device comprised of two-dimensionally arranged light-receiving elements, a plurality of vertical CCDs (charge coupled devices), and a horizontal CCD (instead a plurality of horizontal CCDs can be included). The vertical CCDs vertically extend along vertical columns of light-receiving elements. The horizontal CCD horizontally extends and is connected to respective one ends of the vertical CCDs. Via the vertical and horizontal CCDs, luminance signals are taken out from the light-receiving elements in a predetermined order.

An image pickup device of the above kind has several hundred thousand to several million pixels and is formed on a semiconductor wafer, which ordinarily includes a certain level of substrate deficit (point defect).

Generally, the luminance signal at the pixel corresponding to a point defect is high in luminance all the time irrespective of the amount of light received by the light-receiving element including the point defect, and does not affect luminance signals at adjacent pixels. Hence, only one point on the resulting image becomes white in color.

To overcome the above described problem caused by point defects, a known image defect correction apparatus stores data indicating the position of a defective pixel in a solid-state image pickup device and the defective component level of output signal at the defective pixel, and performs defect correction in accordance with electric charge accumulation time at the defective pixel (see, for example, Japanese Patent Laid-open No. 1-103375 matured into Japanese Patent No. 2565261).

Since luminance signals are usually shifted in a vertical CCD and output therefrom, when there is a point defect in the vertical CCD which the luminance signals pass through, all the luminance signals are affected by the point defect. Specifically, the intensities of all the luminance signals output from one vertical pixel array via the vertical CCD including the point defect increase by amounts corresponding to time periods required for the signals to pass through the defect. The luminance signals from the vertical pixel array are higher in luminance than those attained when there is no defect in the CCD, and as a result, a white vertical line is formed on the resulting image.

To eliminate such a problem due to a point defect in a vertical CCD, an image defect correction apparatus has been proposed (see, for example, Japanese Patent Laid-open No. 2004-364266), which subtracts an average value of luminance signals detected by a light shielding portion or a vertical dummy portion of a solid-state image pickup device from each of luminance signals output from a vertical CCD including a point defect.

However, the above described image defect correction apparatus is merely adapted to a case where there is only one point defect at the maximum in one vertical CCD.

If, for example, there are 10 point defects in the entire vertical CCDs of a solid-state image pickup device having 3000 pixels in the horizontal direction, the probability of occurrence of a plurality of point defects in one vertical CCD is represented as follows:

Probability=1−(probability of occurrence of not more than one point defect in one vertical CCD)=1−PERMUT(3000, 10)/(3000^10)≈0.015=1.5%, where PERMUT(Na, Nb) represents the number of permutation with Nb elements chosen from Na elements.

As explained above, the probability of presence of a plurality of point defects in one vertical CCD is not rare. In that case, the conventional image defect correction apparatus cannot make less prominent a white vertical line.

SUMMARY OF THE INVENTION

The present invention provides an image defect correction apparatus and method that are capable of satisfactorily correcting a white vertical line caused by a plurality of point defects in the same vertical CCD, and provides a program for causing a computer to implement the image defect correction method.

According to a first aspect of the present invention, there is provided an image defect correction apparatus for correcting image defect components included in luminance signals outputted in a predetermined order from two-dimensionally arranged light-receiving elements via a plurality of vertical charge coupled devices and at least one horizontal charge coupled device, comprising a determination unit adapted to determine an X address that specifies each of at least one vertical charge coupled device including at least one point defect among the plurality of vertical charge coupled devices, and determine a Y address that specifies a position of the point defect on the specified vertical charge coupled device, a first correction value calculation unit adapted to determine a first correction value in accordance with a difference between an average value of luminance signals obtained by the vertical charge coupled device specified by the X address determined by the determination unit and an average value of luminance signals obtained by the plurality of vertical charge coupled devices when the light-receiving elements face a predetermined ineffective signal region, a region determination unit adapted to determine, in a case where there are a plurality of point defects in a same vertical charge coupled device, to which of a plurality of regions divided by Y addresses of the plurality of point defects each of Y-directional positions of luminance signals outputted from the horizontal charge coupled device is positioned, a second correction value calculation unit adapted to select, among a plurality of predetermined coefficients corresponding to the plurality of point defects, a predetermined coefficient corresponding to the region determined by the region determination unit, and calculate a second correction value by multiplying the first correction value calculated by the first correction value calculation unit by the selected predetermined coefficient, and a correction unit adapted to correct the luminance signals outputted from the horizontal charge coupled device, using the second correction values calculated by the second correction value calculation unit.

According to a second aspect of the present invention, there is provided an image defect correction method for use in an image defect correction apparatus for correcting image defect components included in luminance signals outputted in a predetermined order from two-dimensionally arranged light-receiving elements via a plurality of vertical charge coupled devices and at least one horizontal charge coupled device, comprising a determination step of determining an X address that specifies each of at least one vertical charge coupled device including at least one point defect among the plurality of vertical charge coupled devices, and determining a Y address that specifies a position of the point defect on the specified vertical charge coupled device, a first correction value calculation step of determining a first correction value in accordance with a difference between an average value of luminance signals obtained by the vertical charge coupled device specified by the X address determined in said determination step and an average value of luminance signals obtained by the plurality of vertical charge coupled devices when the light-receiving elements face a predetermined ineffective signal region, a region determination step of determining, in a case where there are a plurality of point defects in a same vertical charge coupled device, to which of a plurality of regions divided by Y addresses of the plurality of point defects each of Y-directional positions of respective luminance signals outputted from the horizontal charge coupled device is positioned, a second correction value calculation step of selecting, among a plurality of predetermined coefficients corresponding to the plurality of point defects, a predetermined coefficient corresponding to the region determined in the region determination step, and calculating a second correction value by multiplying the first correction value calculated in the first correction value calculation step by the selected predetermined coefficient, and a correction step of correcting the luminance signals outputted from the horizontal charge coupled device, using the second correction values calculated in the second correction value calculation step.

According to a third aspect of the present invention, there is provided a computer-readable program for causing a computer to execute the image defect correction method.

Further features of the present invention will become apparent from the following description of an exemplary embodiment with reference to the attached drawings.

BRIEF DESCRIPTION OF THE DRAWINGS

FIG. 7 is a view showing the construction of line defect information held by a line defect information hold unit;

DETAILED DESCRIPTION OF THE PREFERRED EMBODIMENT

The present invention will now be described in detail below with reference to the drawings showing a preferred embodiment thereof.

Figure 1:
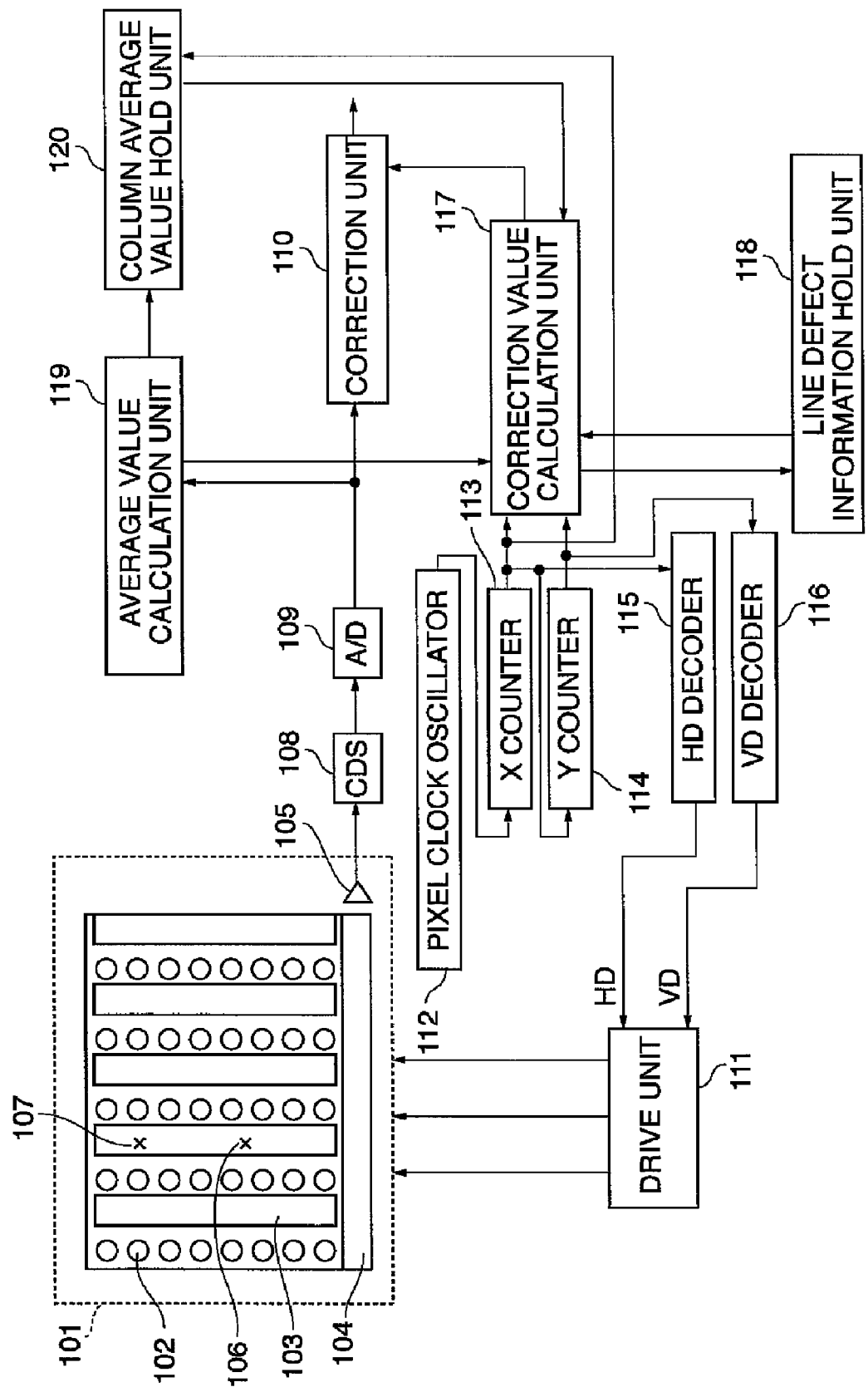
FIG. 1 is a block diagram showing the construction of part of an image pickup apparatus that includes an image defect correction apparatus according to one embodiment of the present invention.

FIG. 1 is a block diagram showing the construction of part of an image pickup apparatus that includes an image defect correction apparatus according to one embodiment of the present invention.

Referring to FIG. 1, reference numeral 101 denotes an image pickup device comprised of a plurality of light-receiving elements 102, a plurality of vertical CCDs (charge coupled devices) 103, a horizontal CCD (charge coupled device) 104, and an output amplifier 105. The light-receiving elements 102 are two-dimensionally arranged and adapted to convert light into electric charge. The vertical CCDs 103 vertically extend along vertical columns of the light-receiving elements 102, and the horizontal CCD 104 horizontally extends and is connected to respective one ends of the vertical CCDs 103. Each vertical CCD 103 receives electric charges output from the light-receiving elements 102 concerned, and cooperates with the horizontal CCD 104 to transfer (shift) the charges. Reference numerals 106, 107 denote point defects which are present in the same vertical CCD in the image pickup device 101 and which will be described in detail later with reference to FIG. 4.

Reference numeral 108 denotes a CDS amplifier that removes, using correlated dual sampling, noise on luminance signals output from the output amplifier 105, and then amplifies the luminance signals. Reference numeral 109 denotes an A/D converter for converting an analog signal into a digital signal, and 110 denotes a correction unit for making less prominent a white vertical line. Reference numeral 119 denotes an average value calculation unit for integrating luminance signals in a specified part of an image region with respect to each and all of columns of vertical CCDs 103 and for determining an average value of the luminance signals in all the columns of vertical CCDs 103 and an average value of the luminance signals in each of the columns of vertical CCDs 103. Reference numeral 120 denotes a column average value hold unit for holding the average value for each column.

Reference numeral 112 denotes a pixel clock oscillator comprised of, e.g., a quartz oscillator and adapted to output a pixel clock at intervals of a period corresponding to a luminance signal readout time per pixel. Reference numeral 113 denotes an X counter that counts up to a predetermined value in accordance with the pixel clock output from the pixel clock oscillator 112. Reference numeral 114 denotes a Y counter that counts up to a predetermined value by incrementing a count value each time the X counter 113 is reset. Reference numeral 115 is an HD decoder that decodes an X counter value which is an output of the X counter 113 and generates a horizontal synchronization signal HD. Reference numeral 116 is a VD decoder that decodes a Y counter value which is an output from the Y counter 114 and generates a vertical synchronization signal VD. Reference numeral 111 is a drive unit that receives the horizontal synchronization signal HD and the vertical synchronization signal VD, and in accordance with a predetermined drive signal pattern, generates a horizontal transfer pulse, a vertical transfer pulse, and a readout pulse. Reference numeral 117 denotes a correction value calculation unit for calculating a correction value used to make less prominent a white vertical line, and 118 denotes a line defect information hold unit for holding line defect information.

Next, operation of the image defect correction apparatus shown in FIG. 1 will be described.

The pixel clock output from the pixel clock oscillator 112 is counted by the X counter 113. The X counter 113 is a counter for counting a horizontal period, which is one of timings in which the image pickup device 101 is driven. In a case where 1000 pixel clocks are generated in the horizontal period with which the image pickup device 101 is driven, the X counter 113 increments its count value each time the pixel clock is input to count from 0 to 999, the count value being reset to zero when the next pixel clock is input.

The Y counter 114 is a counter for counting the vertical period, which is one of timings in which the image pickup device 101 is driven. In case that two hundred line horizontal periods are equal to the vertical period with which the image pickup device 101 is driven, the Y counter 114 increments its count value each time the X counter 113 is reset to zero, thereby counting from 0 to 199. Upon the next resetting of the X counter 113, the count value of the Y counter 114 is reset to zero.

The HD decoder 115 decodes an X counter value output from the X counter 113 to generate a horizontal synchronization signal HD. The VD decoder 116 decodes a Y counter value output from the Y counter 114 to generate a vertical synchronization signal VD.

In accordance with horizontal and vertical synchronization signals HD and VD, the drive unit 111 generates a horizontal transfer pulse, vertical transfer pulse, and readout pulse. The horizontal transfer pulse is a pulse for driving the horizontal CCD 104, and the vertical transfer pulse is a pulse for driving the vertical CCDs 103. The readout pulse is a pulse for reading out electric charges from the light-receiving elements 102 to the plurality of vertical CCDs 103, the electric charges being obtained by photoelectric conversion in the light-receiving elements 102.

In the image pickup device 101, electric charges are simultaneously read out from all the light-receiving elements 102 to the plurality of vertical CCDs 103 in accordance with the readout pulse. In the vertical CCDs 103, electric charges are line-shifted in accordance with the vertical transfer pulses, and electric charge at the lowest part of each vertical CCD 103 is output to the horizontal CCD 104. In the horizontal CCD 104, electric charges are shifted in the right direction in accordance with the horizontal transfer pulses, and are sequentially output to the output amplifier 105. As a result, pieces of pixel data are output via the output amplifier 105 from the image pickup device 101.

The pixel data outputted from the image pickup device 101 are subjected to noise removal and signal amplification in the CDS amplifier 108, are converted from analog signals to digital signals in the A/D converter 109, are subjected to white vertical line correction in the correction unit 110, and are outputted.

In the following, timing in which the white vertical line correction is executed will be described with reference to FIG. 2.

Figure 2:
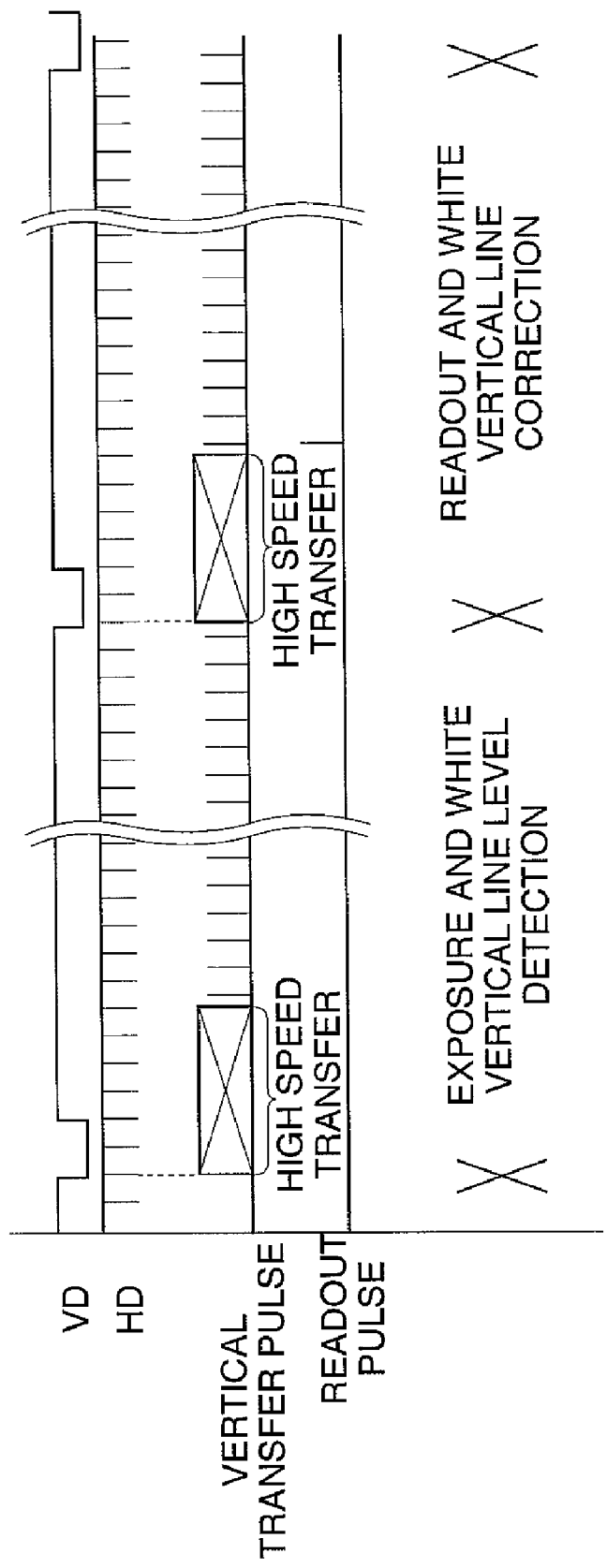
FIG. 2 is a timing chart showing a relation between white vertical line correction execution timing and vertical synchronization signal, horizontal synchronization signal, vertical transfer pulse, and readout pulse.

FIG. 2 is a timing chart showing a relation between white vertical line correction execution timing and vertical synchronization signal VD, horizontal synchronization signal HD, vertical transfer pulse and readout pulse.

The white vertical line correction is carried out for a two-frame period. One frame period is a period from the negative-going edge of a given vertical synchronization signal VD to the negative-going edge of the next vertical synchronization signal VD.

In the first frame, exposure processing and white vertical line level detection processing are carried out. In the next frame, readout processing and white vertical line correction processing are carried out, and the readout pulse is output from the drive unit 111.

In each of the first and next frames, the drive unit 111 generates vertical transfer pulses for high speed transfer over a predetermined time period starting immediately after the negative-going edge of the vertical synchronization signal VD. For normal transfer, the drive unit 111 generates one vertical transfer pulse in one H period (one period of the horizontal synchronization signal HD), and each vertical CCD 103 performs a one-line shift in one H period. For high speed transfer, on the other hand, the drive unit 111 generates, e.g., 10 vertical transfer pulses in one H period, and each vertical CCD 103 performs a 10-line shift. The vertical transfer pulses for high speed transfer are generated for the sweeping out of smear accumulated in the vertical CCDs 103.

After completion of generation of vertical transfer pulses for high speed transfer, vertical transfer pulses for normal transfer are generated for several H periods, e.g., two H periods, thereby stabilizing the substrate potential in the image pickup device 101.

Figure 3:
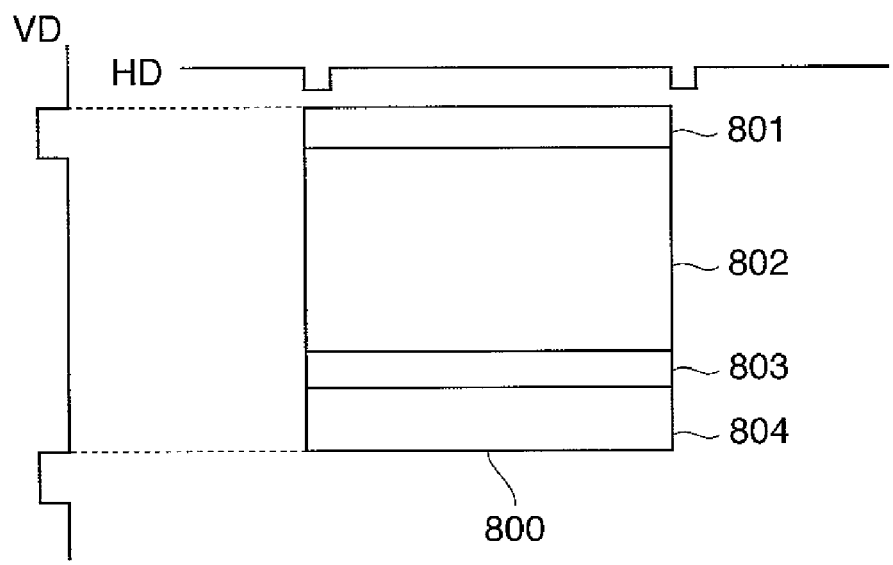
FIG. 3 is a view showing, in association with the vertical and horizontal synchronization signals, an image region imaginarily defined by signals outputted from an image pickup device during one period of the vertical synchronization signal.

With reference to FIG. 3, the white vertical line level detection processing will be described.

FIG. 3 is a view showing an image region 800 in association with vertical and horizontal synchronization signals VD, HD. The image region 800 is imaginarily defined by signals output from the image pickup device 101 during one period of the vertical synchronization signal VD.

As shown in FIG. 3, the image region 800 is an imaginary image region that is imaginarily defined by image signals of one frame which are output from the image pickup device 101, with the time axes of vertical and horizontal synchronization signals VD, HD taken along the ordinate and the abscissa, respectively.

A region 802 in the image region 800 is an effective signal region in which light reception is performed and resultant signals for image formation are output. A region 801 is a first light-shielding region formed above the effective signal region 802, and a region 803 is a second light-shielding region formed below the effective signal region 802. A region 804 is an ineffective signal region that is defined by image signals output from the image pickup device 101 during the remaining time period, which is obtained by subtracting the entire vertical transfer period, corresponding to the total number of lines of the vertical CCD 103, from the period of the vertical synchronization signal VD.

In the first frame shown in FIG. 2, the white vertical line level detection processing is carried out as described below. Referring to FIG. 1 again, the average value calculation unit 119 integrates image signals obtained in the ineffective signal region 804 in FIG. 3, and then determines an average value thereof per one pixel. The integration is carried out for image signals obtained in each of the vertical CCDs 103 (for each column). The integration is also carried out for image signals obtained in all the vertical CCDs 103. The average value of image signals obtained in all the vertical CCDs 103 is output to the correction value calculation unit 117, whereas the average value for each column (the average value of image signals obtained in each of the vertical CCDs 103) is output to the column average value hold unit 120, in which the average values for the respective columns are held.

Hereinafter, the average value of image signals obtained in all the vertical CCDs 103 and calculated by the average value calculation unit 119 will be referred to as the "average value BASE_LEVEL".

In the next frame shown in FIG. 2, still-image readout processing is carried out. To this end, a readout pulse is output. Upon generation of the readout pulse, electric charges accumulated due to photoelectric conversion are transferred from all the light-receiving elements 102 to the vertical CCDs 103. In accordance with each vertical transfer pulse for normal transfers one-line shift is carried out in one H period in each vertical CCD 103. Electric charges transferred to the horizontal CCD 104 during the one H period are then transferred in the horizontal CCD 104 in accordance with horizontal drive pulses and are output via the output amplifier 105.

The correction value calculation unit 117 calculates a correction value for white vertical line correction, as described below. Specifically, in accordance with the present X count value in the X counter 113, a column average value for the corresponding column is read out from the column average value hold unit 120, and pieces of information representing the position and degree of each of one or more point defects in the corresponding vertical CCD 103 are acquired from the line defect information hold unit 118. Based on the column average value and the point defect information, a correction value is calculated for output to the correction unit 110. In accordance with the correction value sent from the correction value calculation unit 117, the correction unit 110 carries out white vertical line correction.

Figure 4:
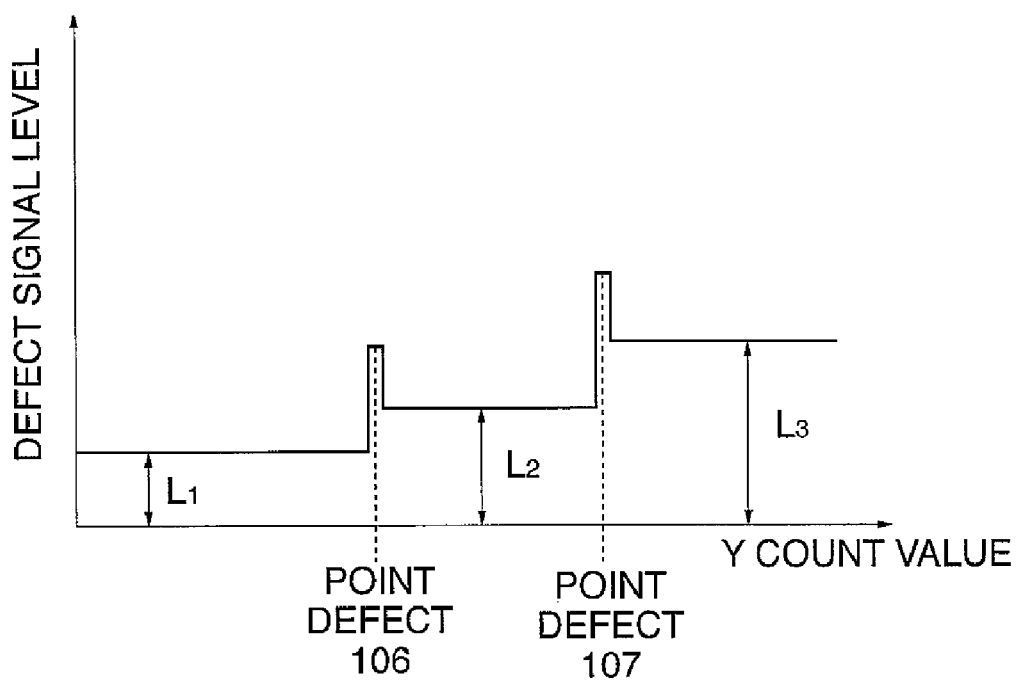
FIG. 4 is a view showing a change in level of the output signal (defect signal) from the image pickup device in a case where two point defects are present in the same vertical CCD in the image pickup device.

With reference to FIG. 4, the correction value calculation in the correction value calculation unit 117 will further be described in detail below.

FIG. 4 is a view showing a change in level of the output signal (defect signal) from the image pickup device 101 in a case where two point defects 106, 107 are present in the same vertical CCD in the image pickup device 101. The level change in FIG. 4 indicates a level change in case that a still image is fetched into the image pickup device 101.

In general, the level of a defect signal generated by the presence of a point defect varies in proportion to the period of the vertical transfer pulse.

Symbol L1 in FIG. 4 represents the sum of defect signal levels generated by the point defects 106, 107 while vertical transfer pulses for high speed transfer are being generated.

The defect signal level increases by one line at the position of the point defect 106 for the reason that when the readout pulse is output, vertical transfer pulses are stopped from being generated for several H periods.

Symbol L2 indicates a level attained by the addition of a defect signal level to the level L1, the defect signal level being generated by the point defect 106 as vertical transfer pulses for normal transfer are being generated.

The defect signal level increases by one line at the position of the point defect 107 for the above reason that vertical transfer pulses are stopped from being generated for several H periods when the readout pulse is output.

Symbol L3 indicates a level attained by the addition to the level L2 of a defect signal level generated by the point defect 107 as vertical transfer pulses for normal transfer are being generated.

The level L3 is nearly equal to a value obtained by subtracting the average value BASE_LEVEL from the average value of image signals in the column of the vertical CCD in which the point defects 106, 107 are present, the latter average value being held by the column average value hold unit 120.

Assuming that a defect signal level generated per unit time by the point defect 106 is $\alpha$, a defect signal level generated per unit time by the point defect 107 is $\beta$, and the ratio between $\alpha$ and $\beta$ is $\gamma$, the defect signal level $\beta$ is represented by the following formula (1).

$$\beta = \alpha\gamma \qquad (1)$$

Assuming that the period of the vertical transfer pulse for high speed transfer is Tf and the period of the vertical transfer pulse for normal transfer is Tn, the levels L1, L2, and L3 are represented by the following formulae (2) to (4).

$$L1 = Tf\alpha + Tf\beta = Tf\alpha + Tf\alpha\gamma = \alpha(Tf + Tf\gamma) \qquad (2)$$

$$L2 = L1 + Tn\alpha = \alpha(Tf + Tf\gamma + Tn) \qquad (3)$$

$$L3 = L2 + Tn\beta = L2 + Tn\alpha\gamma = \alpha(Tf + Tf\gamma + Tn + Tn\gamma) \qquad (4)$$

In accordance with the formula (4), the defect signal level $\alpha$ is represented by the following formula (5).

$$\alpha = L3/(Tf + Tf\gamma + Tn + Tn\gamma) \qquad (5)$$

The periods Tf, Tn are determined beforehand according to the drive pattern. The ratio $\gamma$ can be determined in advance by adjustment processing, which will be described below. The level L3 has a value nearly equal to a value obtained by subtracting the average value BASE_LEVEL from the average value in the column of the vertical CCD including the point defects 106, 107, the column average value being held by the column average value hold unit 120. Thus, an actual value of the defect signal level $\alpha$ can be calculated in accordance with the formula (5).

Using the defect signal level $\alpha$, the predetermined periods Tf, Tn, and the predetermined ratio $\gamma$, the correction value calculation unit 117 can calculate actual values of the levels L1, L2.

Using one of the levels L1 to L3 thus obtained, the correction unit 110 performs subtraction from a value of the output signal from the A/D converter 109, whereby the white vertical line correction is realized.

Next, an explanation will be given of a relation observed at the time of electronic viewfinder action or moving image action between vertical synchronization signal VD, horizontal synchronization signal HD, vertical transfer pulse, and readout pulse.

Figure 5:
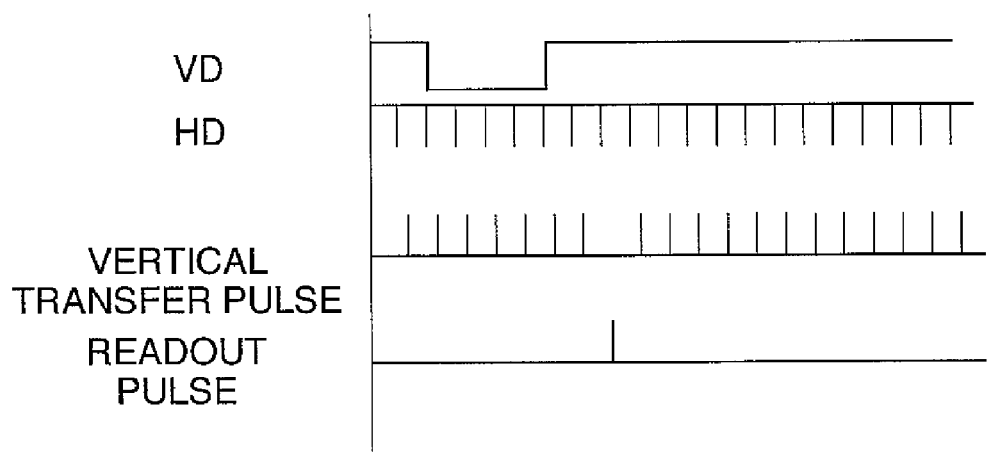
FIG. 5 is a timing chart showing a relation observed at the time of electronic viewfinder action or moving image action between vertical synchronization signal, horizontal synchronization signal, vertical transfer pulse, and readout pulse.

FIG. 5 is a timing chart showing a relation between vertical synchronization signal VD, horizontal synchronization signal HD, vertical transfer pulse, and readout pulse at the time of electronic viewfinder action or moving image action.

The vertical transfer pulses are stopped from being generated in the vicinity of the readout pulse. Except for the stoppage of pulse generation in the vicinity of the readout pulse, one vertical transfer pulse is generated in one H period when the electronic viewfinder action or the moving image action is being carried out. In the vertical CCDs 103, a one-line shift is performed in one H period. When the electronic viewfinder action or the moving image action is carried out, therefore, smear is not swept out by the generation of vertical transfer pulses for high speed transfer.

Figure 6:
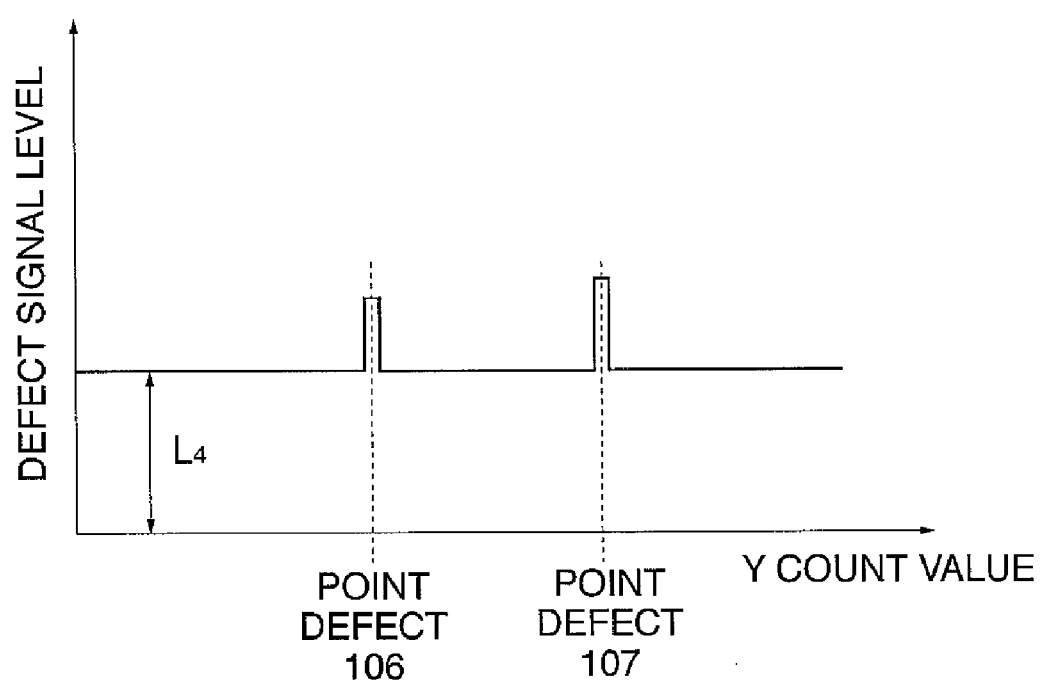
FIG. 6 is a view showing a level change in the output signal (defect signal) from the image pickup device 101 at the time of electronic viewfinder action or moving image action.

For this reason, even if the point defects 106 and 107 are present, the defect signal level of the output signal from the image pickup device 101 is uniform (at the level L4) as shown in FIG. 6, except for lines on which the point defects 106, 107 are present. FIG. 6 is a view showing a level change in the output signal (defect signal) from the image pickup device 101 at the time of electronic viewfinder action or moving image action.

The reason why the defect signal level is large in the lines where the point defects 106 and 107 are present is that vertical transfer pulses are stopped from being generated in the vicinity of the readout pulse, as described above.

The magnitude of level L4 shown in FIG. 6 is nearly equal to a value obtained by subtracting the average value BASE_LEVEL from the average value in the column in which the point defects 106, 107 are present, the column average value being held by the column average value hold unit 120. As a correction value, a value obtained by subtracting the average value BASE_LEVEL from the column average value is output from the correction value calculation unit 117 to the correction unit 110.

As described above, the way of white vertical line correction is switched between when the still image action is performed and when the electronic viewfinder action or the moving image action is performed. As a result, while using the same image pickup device 101, it is possible to realize the white vertical line correction suitable for both the still image action and the electronic viewfinder action or the moving image action. This makes it possible to satisfactorily perform the still image shooting and the moving image shooting with the same image pickup device.

FIG. 7 is a view showing the construction of line defect information held by the line defect information hold unit 118.

The line defect information hold unit 118 holds pieces of information (line defect information) representing the positions and degrees of point defects in a plurality of vertical CCDs 103, with the line defect information being divided into ones for respective vertical CCDs 103 (on a column-by-column basis). The line defect information hold unit 118 is capable of holding two pieces of point defect information (line defect information) at the maximum for the same vertical CCD (i.e., for the same column). A table number is provided for each column. The line defect information for each column is comprised of a line defect X address, a first Y address, a second Y address, a first Y address coefficient, and a second Y address coefficient.

In accordance with the table number, the line defect information hold unit 118 outputs a set of information comprised of a line defect X address, a first Y address, a second Y address, a first Y address coefficient, and a second Y address coefficient. The above described action of the line defect information hold unit 118 can be realized by forming the unit 118 by a SRAM and by using SRAM addresses as table numbers.

The line defect X address is an X counter value of the X counter 113 that specifies the vertical CCD (column) in which one or more point defects are present among the plurality of the vertical CCDs 103. The first and second Y addresses are Y counter values of the Y counter 114 to specify the vertical positions of two point defects, if any, in the same vertical CCD. In the line defect information hold unit 118, line defect X addresses are sorted in ascending order, and in the same table number, the first and second Y addresses are sorted in ascending order.

The first and second Y address coefficients K11, K12 are respectively represented by the following formulae (6), (7).

$$K11 = L1/L3 \quad (6)$$

$$K12 = L2/L3 \quad (7)$$

By substituting the formulae (2) to (4) into the formulae (6), (7), the following formulae (8), (9) can be obtained.

$$K11 = (Tf + Tf\gamma)/(Tf + Tf\gamma + Tn + Tn\gamma) \quad (8)$$

$$K12 = (Tf + Tf\gamma + Tn)/(Tf + Tf\gamma + Tn + Tn\gamma) \quad (9)$$

The line defect information hold unit 118 is arranged to hold at the maximum two pieces of point defect information (line defect information) for the same vertical CCD (i.e., for the same column), however, it is possible to arrange the unit 118 to be capable of holding three or more pieces of point defect information (line defect information).

In a case where there is one point defect in the same vertical CCD (the same column), all the bits of the second Y address are made equal to 1 to indicate that there is no second Y address. For example, in the case of the Y counter 114 having 16 bits, the second Y address is set to have a value of 0XFFFF. In the case where there is one point defect in the same vertical CCD (the same column), the second Y address coefficient is set to have a value of zero.

As described above, the line defect information hold unit 118 holds, as a table, a set of pieces of information comprised of X address, Y addresses, and Y address coefficients on point defects on each vertical CCD. As a result, a table suited to the image pickup device can be provided, and white vertical line correction suited for each individual image pickup device can be carried out.

By sorting beforehand data stored in the table, amounts of pieces of information which must simultaneously be referred to by the correction value calculation unit 117 can be reduced, making it possible to decrease the circuit scale of the unit 117.

Figure 8:
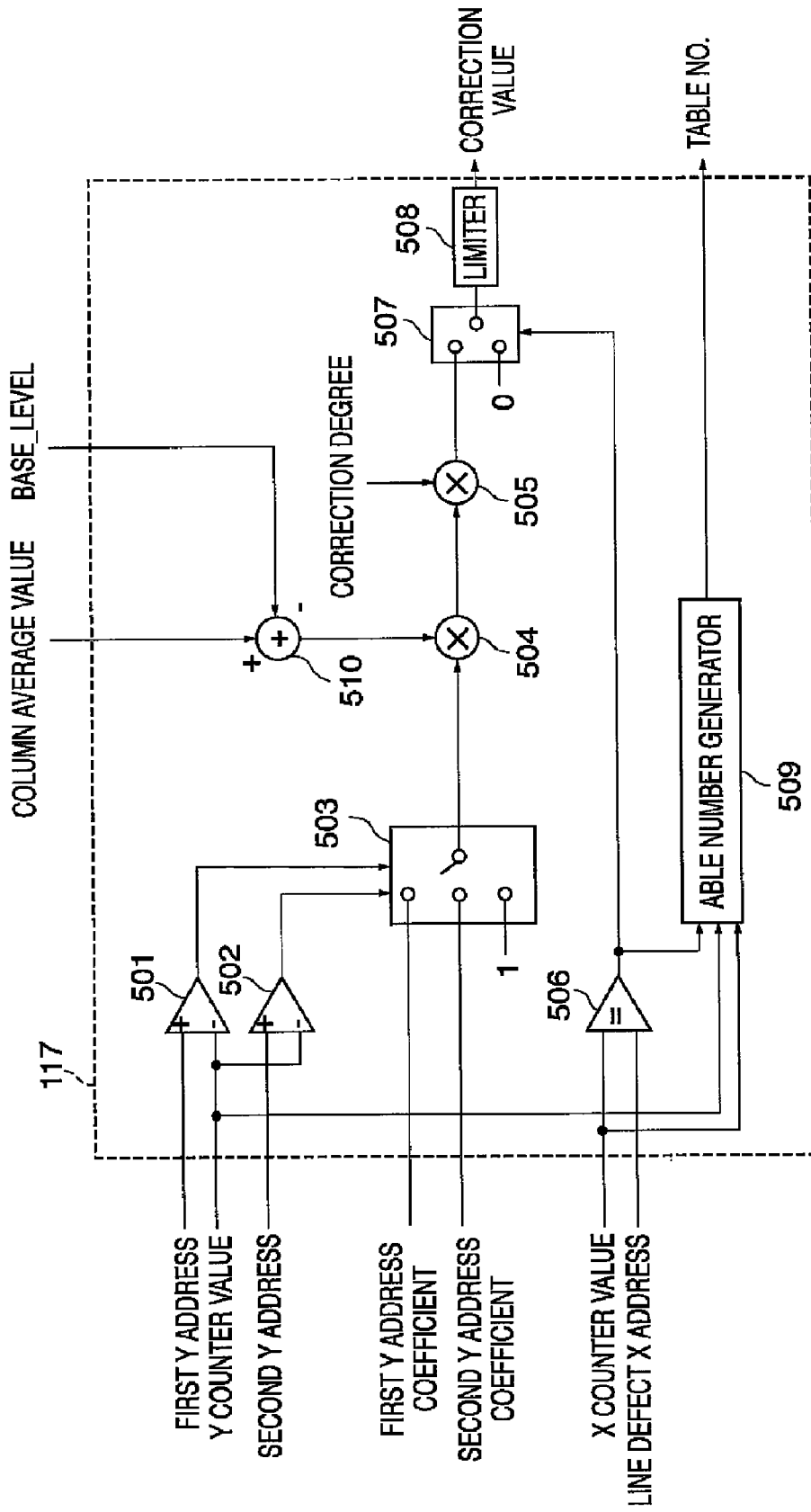
FIG. 8 is a circuit diagram showing the internal construction of a correction value calculation unit.

FIG. 8 is a circuit diagram showing the internal construction of the correction value calculation unit 117.

Referring to FIG. 8, reference numeral 501 and 502 denote comparators, 503 and 507 denote selectors, 504 and 505 denote multipliers, 506 denotes a coincidence detector, 509 denotes a table number generator, 508 denotes a limiter, and 510 denotes a subtractor.

The table number generator 509 is reset to zero each time the X counter value is reset, and then starts counting from a value of zero. The count is up each time the coincidence detector 506 detects that the X counter value is coincident with the line defect X address.

The count value of the table number generator 509 corresponds to a table number in the line defect information hold unit 118. In accordance with the count value (table number) outputted from the table number generator 509, the line defect information hold unit 118 outputs a line defect X address, a first Y address, a second Y address, a first Y address coefficient, and a second Y address coefficient to the correction value calculation unit 117.

In the unit 117, the comparator 501 compares the Y counter value with the first Y address, whereas the comparator 502 compares the Y counter value with the second Y address. As a result, it is determined whether or not the Y counter value is smaller than the first Y address, or between the first and second Y addresses, or larger than the second Y address.

In the case of still image shooting, the correction value of the white vertical line varies as shown in FIG. 4 in accordance with a magnitude relation between the point defect position and the Y address. When the Y counter value is less than the first Y address, the selector 503 selects the first Y address coefficient. If the Y counter value is between the first and second Y addresses, the selector 503 selects the second Y address coefficient. If the Y counter value is larger than the second Y address, the selector 503 selects a value of 1.

In the case of moving image shooting, the correction value of the white vertical line remains constant as shown in FIG. 6, irrespective of the relation between the point defect position and the Y address. Thus, the selector 503 select a value of 1.

The subtractor 510 in FIG. 8 subtracts an average value BASE_LEVEL from a column average value selected from the column average value hold unit 120 in accordance with the X counter value. The multiplier 504 multiplies the value obtained by the subtractor 510 by a value selected by the selector 503.

The multiplier 505 multiplies the value obtained by the multiplier 504 by a correction degree, which is a predetermined fixed value. The correction degree is a value for adjusting the degree of correction to the white vertical line.

The value obtained by the multiplier 505 is supplied to one input terminal of the selector 507 having another input terminal to which a value of 0 is inputted. The selection by the selector 507 is performed in accordance with a result of detection by the coincidence detector 506 indicating whether or not the X counter value is coincident with the line defect X address. When the coincidence is detected by the coincidence detector 506, the current X counter value is coincident with the position of generation of the white vertical line, and hence the selector 507 selects the output value of the multiplier 505. On the other hand, when non-coincidence is detected by the coincidence detector 506, the current X counter value is not coincident with the position of generation of the white vertical line, and hence the selector 507 selects a value of 0, thereby not performing the correction.

In a case where there are a plurality of point defects in one vertical CCD, a correction value is determined for each of regions divided according to the point defects, as described above, making it possible to satisfactorily correct a white vertical line.

The output value from the selector 507 is supplied to the limiter 508.

Figure 9:
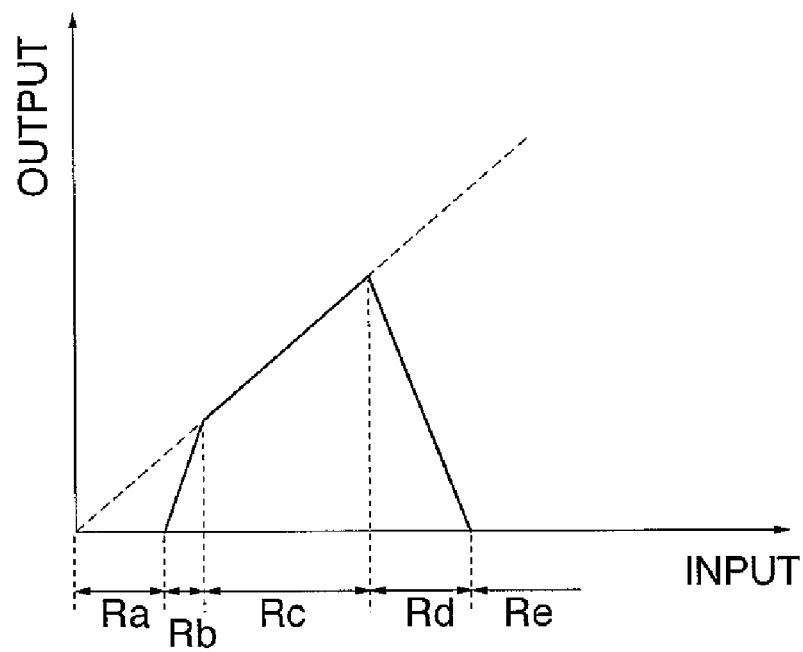
FIG. 9 is a view showing an input/output characteristic of a limiter.

FIG. 9 is a view showing an input/output characteristic of the limiter 508.

The limiter 508 outputs a value corresponding to the input value in accordance with the input/output characteristic shown in FIG. 9. The output value is a correction value to be outputted from the correction value calculation unit 117.

In a region Ra in FIG. 9, a correction value is sufficiently small and hence correction is not performed, whereas correction is performed in a region Rc. A region Rb is a transition region for smooth changeover between the region Ra in which correction is not performed and the region Rc in which correction is performed.

In a region Re, the correction value is large and hence correction is not performed. A region Rd is a transition region for smooth changeover between the region Rc in which correction is performed and the region Re in which correction is not performed.

Boundaries between the above described regions are changed depending on the temperature of the image pickup device 101 and exposure time.

Figure 10:
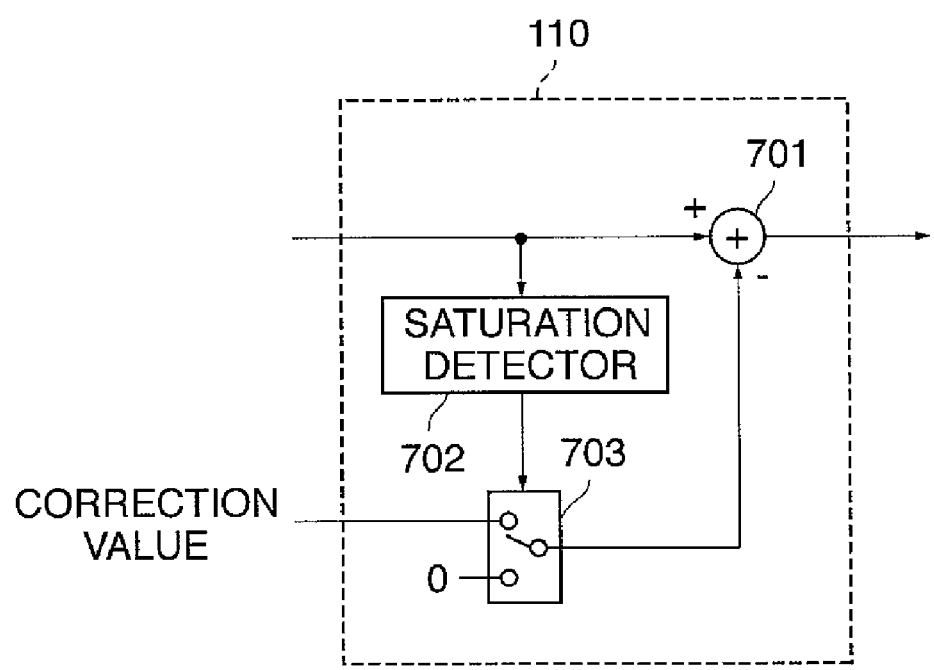
FIG. 10 is a circuit diagram showing the internal construction of a correction unit.

FIG. 10 is a circuit diagram showing the internal construction of the correction unit 110.

Referring to FIG. 10, reference numeral 702 denotes a saturation detector for detecting saturation when the level of an input signal exceeds a predetermined value. Reference numeral 703 denotes a selector, and 701 denotes a subtractor.

When the saturation detector 702 does not detect saturation, the selector 703 selects the inputted correction value, and the subtractor 701 subtracts the correction value from the input signal, and outputs the resultant value.

On the other hand, when the saturation detector 702 detects saturation, the selector 703 selects a value of 0, and the subtractor 701 subtracts zero from the input signal. Thus, the subtractor outputs the input signal as it is. When the input signal is saturated, therefore, no correction to the white vertical line is performed.

Next, with reference to FIGS. 11 to 13, an explanation will be given of adjustment processing for determining in advance a ratio γ in the formula (1) given above.

Figure 11:
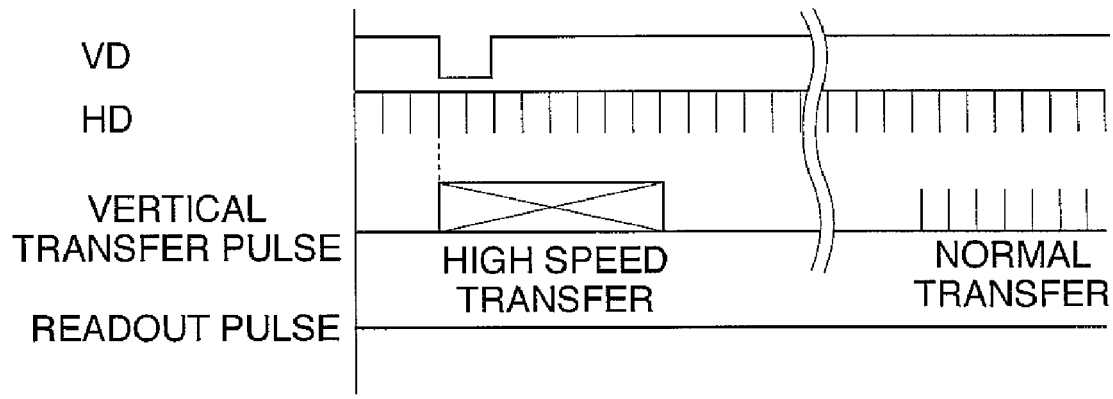
FIG. 11 is a timing chart showing a relation between vertical synchronization signal, horizontal synchronization signal, vertical transfer pulse, and readout pulse at the time of adjustment processing.

FIG. 11 is a timing chart showing a relation between vertical synchronization signal VD, horizontal synchronization signal HD, vertical transfer pulse, and readout pulse at the time of adjustment processing. FIG. 12 is a view showing a level change in the output signal (defect signal) from the image pickup device 101 at the time of adjustment processing. FIG. 13 is a flowchart showing the procedure of the adjustment processing performed by the image defect correction apparatus. In the following, with reference to the flowchart of FIG. 13 and with reference also to FIGS. 11-12 where required, the adjustment processing will be described.

The adjustment processing is carried out in a condition the image pickup device 101 is optically shielded.

In a step S1001, readout is prohibited. Specifically, the drive unit 111 is stopped from outputting the readout pulse.

In a step S1002, high speed transfer is carried out. Specifically, the drive unit 111 outputs vertical transfer pulses for high speed transfer. As a result, vertical transfer pulses having a shorter period than that at the time of normal transfer are outputted, whereby smear in the vertical CCDs 103 is swept out.

In a step S1003, vertical transfer is stopped. More specifically, immediately after the vertical transfer pulses for high speed transfer are outputted, the drive unit 111 is stopped from outputting the vertical transfer pulses. As a result, electric charge corresponding to dark current is accumulated in a vertical CCD including a point defect, the electric charge being produced at the point defect and larger in quantity than that produced around the point defect.

In a step S1004, normal transfer is carried out and an image is taken in. Specifically, the vertical transfer pulses for normal transfer are outputted to the drive unit 111.

As a result, a step S1005 detects a point defect. Specifically, when there are point defects 106, 107 in a vertical CCD, a defect signal outputted from the image pickup device 101 has a level large enough to be detected as a point defect, as shown in FIG. 12.

Figure 12:
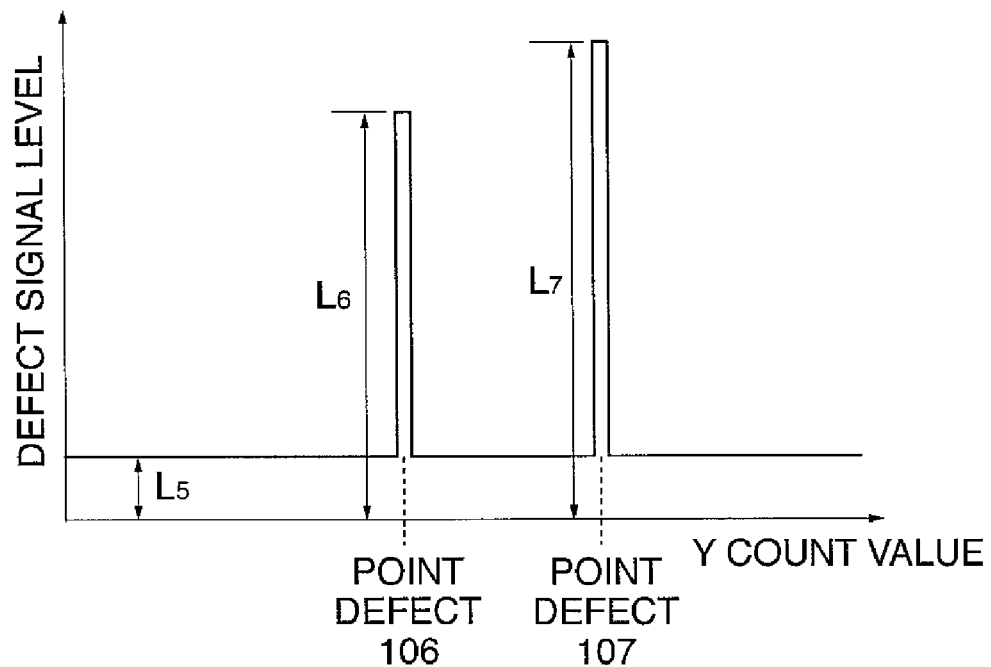
FIG. 12 is a view showing a level change in the output signal (defect signal) from the image pickup device at the time of adjustment processing.
Figure 13:
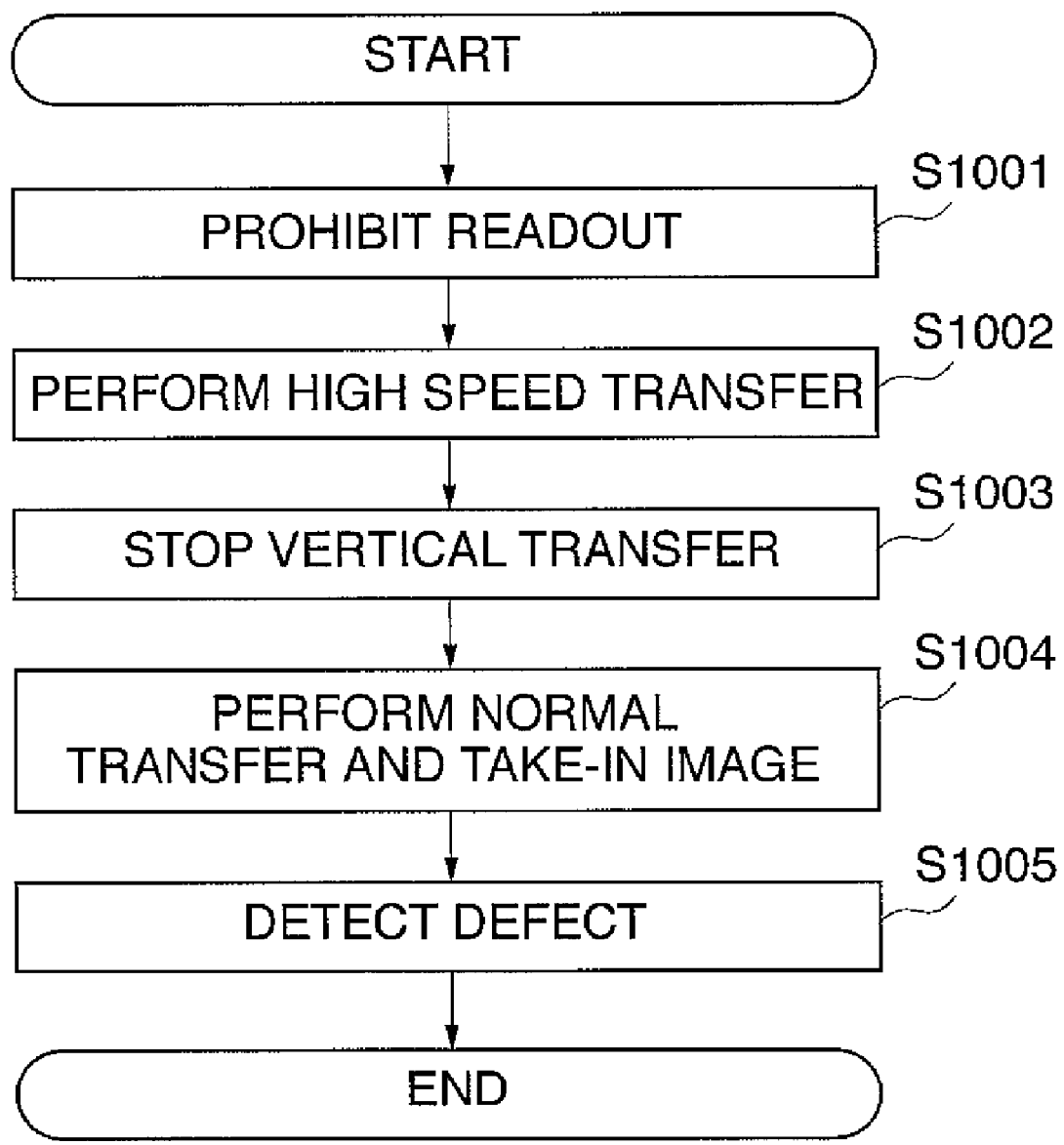
FIG. 13 is a flowchart showing the procedure of the adjustment processing performed by the image defect correction apparatus.

In FIG. 12, L5 represents the average level of output signals from the image pickup device 101, whereas L6 and L7 represent defect signal levels at the point defects 106, 107. A value obtained by subtracting the level L5 from the level L6 represents a signal level varying in accordance with the defect degree of the point defect 106, whereas a value obtained by subtracting the level L5 from the level L7 represents a signal level varying depending on the defect degree of the point defect 107.

Thus, a defect signal level ratio γ is represented by the following formula (10).

$$\gamma=(L7-L5)/(L6-L5) \tag{10}$$

As described above, in this embodiment, an appropriate coefficient is selected from predetermined coefficients in accordance with the relation between the Y address and the position of a point defect on a vertical CCD. Thus, even if there are a plurality of point defects on the same vertical CCD, a white vertical line caused by the presence of the point defects can appropriately be corrected. This makes it possible to improve the yielding percentage in the fabrication of image pickup devices and suppress the increase in fabrication costs of products, such as digital videos and digital cameras, in which a solid-state image pickup device is employed.

In the above example, the case has been described in which there are not more than two point defects in the same vertical CCD. However, the image defect correction apparatus can be adapted also for the case where there are three or more points defects in the same vertical CCD, by expanding the construction of the line defect information (FIG. 7) in accordance with the maximum number of point defects.

In the above described embodiment, the defect signal level is greater in the positions of point defects 106, 107 than in the vicinity thereof. Nevertheless, no particular processing is performed. Point defect correction may be performed in the vicinity of a point defect, as in the conventional image defect correction apparatus.

In the embodiment, the white vertical line correction is performed for a two-frame period as shown in FIG. 2. Alternatively, the white vertical line correction may be performed for a three-frame period. In that case, exposure processing may be performed in a first frame, white vertical line level detection processing may be performed in a second frame. In a third frame, readout processing and white vertical line correction processing may be performed.

In the above described embodiment, the column average value hold unit 120 holds column average values for all the columns. Alternatively, in accordance with the line defect information, this unit may hold a column average value only for one or more columns to be subjected to the white vertical line correction.

It should be noted that the image defect correction apparatus shown in FIG. 1 is of a hardware construction. Alternatively, the image defect correction apparatus may be formed by an information processing apparatus including a CPU, RAM, ROM, input/output device, etc. In that case, various functions of the above described image defect correction apparatus can be realized by control programs executed by the information processing apparatus.

It is to be understood that the present invention may also be accomplished by supplying a system or an apparatus with a storage medium in which a program code of software, which realizes the functions of the above described embodiment is stored and by causing a computer (or CPU or MPU) of the system or apparatus to read out and execute the program code stored in the storage medium.

In that case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, and a magnetic-optical disk, an optical disk such as a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2006-288925, filed Oct. 24, 2006, which is hereby incorporated by reference herein in its entirety.

What is claimed is:

1. An image defect correction apparatus for correcting image defect components included in luminance signals outputted in a predetermined order from two-dimensionally arranged light-receiving elements via a plurality of vertical charge coupled devices and at least one horizontal charge coupled device, comprising:

a determination unit adapted to determine an X address that specifies each of at least one vertical charge coupled device including at least one point defect among the plurality of vertical charge coupled devices, and determine a Y address that specifies a position of the point defect on the specified vertical charge coupled device;

a first correction value calculation unit adapted to determine a first correction value in accordance with a difference between an average value of luminance signals obtained by the vertical charge coupled device specified by the X address determined by said determination unit and an average value of luminance signals obtained by the plurality of vertical charge coupled devices when the light-receiving elements face a predetermined ineffective signal region;

a region determination unit adapted to determine, in a case where there are a plurality of point defects in a same vertical charge coupled device, to which of a plurality of regions divided by Y addresses of the plurality of point defects each of Y-directional positions of luminance signals outputted from the horizontal charge coupled device is positioned;

a second correction value calculation unit adapted to select, among a plurality of predetermined coefficients corresponding to the plurality of point defects, a predetermined coefficient corresponding to the region determined by said region determination unit, and calculate a second correction value by multiplying the first correction value calculated by said first correction value calculation unit by the selected predetermined coefficient; and a correction unit adapted to correct the luminance signals outputted from the horizontal charge coupled device, using the second correction values calculated by said second correction value calculation unit.

2. The image defect correction apparatus according to claim 1, wherein the plurality of predetermined coefficients have values for use in still image shooting that are different from one another, the plurality of predetermined coefficients having a same value for use in moving image shooting.

3. The image defect correction apparatus according to claim 1, including a table in which X addresses, Y addresses, and predetermined coefficients are held so as to correspond to respective ones of point defects.

4. The image defect correction apparatus according to claim 3, wherein the table holds X addresses, Y addresses, and predetermined coefficients that are associated with all of point defects included in the plurality of vertical charge coupled devices, and holds an X address, Y addresses, and predetermined coefficients associated with a plurality of point defects in a case where there are the plurality of point defects in a same vertical charge coupled device, and
wherein the X addresses are sorted in ascending order in the table and the plurality of Y addresses corresponding to a same X address are sorted in ascending order in the table.

5. The image defect correction apparatus according to claim 1, the predetermined coefficients are each determined in accordance with a relative level ratio between defect signals caused by the plurality of point defects included in the same vertical charge coupled device and a period of a drive pulse for the plurality of vertical charge coupled devices.

6. The image defect correction apparatus according to claim 5, the level ratio is a ratio determined in reference to a point defect closest in position to the horizontal charge coupled device, among the plurality of point defects present in the same vertical charge coupled device.

7. An image defect correction method for use in an image defect correction apparatus for correcting image defect components included in luminance signals outputted in a predetermined order from two-dimensionally arranged light-receiving elements via a plurality of vertical charge coupled devices and at least one horizontal charge coupled device, comprising:
a determination step of determining an X address that specifies each of at least one vertical charge coupled device including at least one point defect among the plurality of vertical charge coupled devices, and determining a Y address that specifies a position of the point defect on the specified vertical charge coupled device;
a first correction value calculation step of determining a first correction value in accordance with a difference between an average value of luminance signals obtained by the vertical charge coupled device specified by the X address determined in said determination step and an average value of luminance signals obtained by the plurality of vertical charge coupled devices when the light-receiving elements face a predetermined ineffective signal region;
a region determination step of determining, in a case where there are a plurality of point defects in a same vertical charge coupled device, to which of a plurality of regions divided by Y addresses of the plurality of point defects each of Y-directional positions of luminance signals outputted from the horizontal charge coupled device is positioned;
a second correction value calculation step of selecting, among a plurality of predetermined coefficients corresponding to the plurality of point defects, a predetermined coefficient corresponding to the region determined in said region determination step, and calculating a second correction value by multiplying the first correction value calculated in said first correction value calculation step by the selected predetermined coefficient; and
a correction step of correcting the luminance signals outputted from the horizontal charge coupled device, using the second correction values calculated in said second correction value calculation step.

8. The image defect correction method according to claim 7, wherein the plurality of predetermined coefficients have values for use in still image shooting that are different from one another, the plurality of predetermined coefficients having a same value for use in moving image shooting.

9. The image defect correction method according to claim 7, wherein a table is used in which X addresses, Y addresses, and predetermined coefficients are held so as to correspond to respective ones of point defects.

10. The image defect correction method according to claim 9, wherein the table holds X addresses, Y addresses, and predetermined coefficients that are associated with all of points defects included in the plurality of vertical charge coupled devices, and holds an X address, Y addresses, and predetermined coefficients associated with a plurality of point defects in a case where there are the plurality of point defects in a same vertical charge coupled device, and
wherein the X addresses are sorted in ascending order in the table and the plurality of Y addresses corresponding to a same X addresses are sorted in ascending order in the table.

11. The image defect correction method according to claim 7, the predetermined coefficients are each determined in accordance with a relative level ratio between defect signals caused by the plurality of point defects included in the same vertical charge coupled device and a period of a drive pulse for the plurality of vertical charge coupled devices.

12. The image defect correction method according to claim 11, the level ratio is a ratio determined in reference to a point defect closest in position to the horizontal charge coupled device, among the plurality of point defects present in the same vertical charge coupled device.

13. A non-transitory computer-readable storage medium storing a program for causing a computer to execute the image defect correction method as set forth in claim 7.

* * * * *